United States Patent [19]

Bosko et al.

[11] Patent Number: 5,004,535
[45] Date of Patent: Apr. 2, 1991

[54] WATER PURIFICATION SYSTEM

[75] Inventors: Robert S. Bosko; Thomas C. Barnes, both of Hermosa Beach, Calif.

[73] Assignee: Aquatec Water Systems Incorporated, Anaheim, Calif.

[21] Appl. No.: 339,392

[22] Filed: Apr. 17, 1989

[51] Int. Cl.⁵ .............................................. B01D 61/10
[52] U.S. Cl. ...................................... 210/90; 210/259; 210/416.1; 210/257.2
[58] Field of Search .................. 210/652, 416.1, 257.2, 210/137, 90, 259

[56] References Cited

U.S. PATENT DOCUMENTS

| Re. 32,144 | 5/1986 | Keefer | 210/637 |
|---|---|---|---|
| 3,505,215 | 4/1970 | Bray | 210/22 |
| 3,506,126 | 4/1970 | Serfass et al. | 210/96 |
| 3,746,640 | 7/1973 | Bray | 210/23 |
| 3,838,774 | 10/1974 | Dolan et al. | 210/85 |
| 3,841,483 | 10/1974 | Overton | 210/87 |
| 3,954,611 | 5/1976 | Reedy | 210/71 |
| 3,964,999 | 6/1976 | Chisdes | 210/23 R |
| 3,992,301 | 11/1976 | Shippey et al. | 210/23 H |
| 4,070,280 | 1/1978 | Bray | 210/652 X |
| 4,118,315 | 10/1978 | Fletcher et al. | 210/23 F |
| 4,160,727 | 7/1979 | Harris, Jr. | 210/23 H |
| 4,218,317 | 8/1980 | Kirschmann | 210/117 |
| 4,366,051 | 12/1982 | Fischel | 210/96.2 |
| 4,399,036 | 8/1983 | Babb et al. | 210/638 |
| 4,399,057 | 11/1979 | Wheatley et al. | 210/23 H |
| 4,498,982 | 2/1985 | Skinner | 210/96.2 |
| 4,508,622 | 4/1985 | Polaschegg et al. | 210/96.2 |
| 4,528,093 | 7/1985 | Winer | 210/96.2 |
| 4,548,716 | 10/1985 | Boeve | 210/652 |
| 4,587,518 | 5/1986 | King | 210/85 X |
| 4,623,467 | 11/1986 | Hamlin | 210/652 |
| 4,702,842 | 10/1987 | Lapierre | 210/651 |
| 4,761,295 | 8/1988 | Casey | 210/652 X |

Primary Examiner—Frank Spear
Attorney, Agent, or Firm—Gordon L. Peterson; Loyal M. Hanson

[57] ABSTRACT

A reverse osmosis water purification system includes a support structure dimensioned and arranged to facilitate manual transportation, purification components mounted on the support structure for producing product water and waste water from feedwater by reverse osmosis, and pump components mounted on the support structure for pumping feedwater from a separate source to the purification means. An accumulator may be included for accumulating the feedwater under pressure, and the support structure may take the form of a suitcase-like component housing a battery supply, a solar panel, water pressure and amperage instrumentation, electrical connectors for various external power sources, and water line connectors for feedwater inlet and both product water and waste water outlet purposes.

8 Claims, 2 Drawing Sheets

WATER PURIFICATION SYSTEM

BACKGROUND OF THE INVENTION

1. Technical Field

This invention relates generally to water treatment, and more particularly to a new and improved reverse osmosis water purification system.

2. Background Information

"Osmosis" involves passage of water molecules through a semipermeable membrane. The molecules usually pass or flow through the membrane from a less concentrated solution to a more concentrated solution. But we can reverse the direction of flow by pressurizing the more concentrated solution. "Reverse osmosis" results.

As the very small water molecules pass through the membrane in the reverse direction, from the more concentrated solution to the less concentrated solution, they leave behind larger molecules. The larger molecules are unable to pass through the membrane and they may include dissolved mineral molecules as well as such contaminants as pesticides, bacteria, and viruses. Thus, reverse osmosis provides a means of removing such matter from water so that reverse osmosis has been used with some success for water treatment purposes.

A typical reverse osmosis water treatment system may include a prefilter, a semipermeable membrane, and a post filter. Water to be treated or feedwater, from a pressurized source, first passes through the prefilter where suspended matter and undissolved solids are removed. Thereafter, it passes under pressure through the semipermeable membrane to separate pure water molecules from remaining dissolved solids and other contaminants and through the post filter to improve odor and taste, with the resulting product water then being consumable.

But there are certain drawbacks with existing reverse osmosis water treatment systems that need to be overcome. For example, such uses as recreational, disaster or other emergency, and military applications as well as the needs of international travelers may require a rugged yet conveniently transportable system. In addition, such uses may require a system that is battery powered yet compatible with any of various other available electrical power sources. Moreover, the system may need to draw feedwater from any of various available sources, such as a puddle of stagnant water, instead of having the feedwater supplied from a pressurized source.

Existing systems, however, do not include all these features. Consequently, it is desirable to have a new and improved water purification system with the added functionality described.

SUMMARY OF THE INVENTION

This invention solves the problems outlined above by combining a number of known components in a portable unit having the desired functionality. Thus, it can be conveniently transported, it can be powered by any of various available electrical power sources, and it can draw feedwater from any of various available water sources.

Generally, a water purification system constructed according to a major aspect of the invention includes a support structure on which the other components are mounted. The support structure is dimensioned and arranged to facilitate manual transportation and it may take the form of a suitcase-like unit having a feedwater inlet and both product water and waste water outlets.

The system includes purification components mounted on the support structure for producing product water and waste water from feedwater by reverse osmosis. A combination of a prefilter, a semipermeable membrane (with 0.0001 micron pores, for example), and a post filter may be combined for that purpose.

Pump components are provided on the support structure for pumping feedwater from a separate source to the purification components. The user simply couples the feedwater to the pump components, such as by connecting a flexible tube feedline to a feedwater inlet on the support structure, and then the user places the tube in a puddle of water. The pump components automatically draw water from the puddle with the purification components purifying the water sufficiently for drinking purposes.

According to another aspect of the invention, accumulator components are provided. They are mounted on the support structure and coupled to the pump components for accumulating the feedwater under pressure for coupling to the purification components. In other words, the accumulator components are coupled upstream from the purification components. As a result, the accumulator components act to maintain flow and pressure against the semi-permeable membrane in the RO membrane 21 while the pump 23 is off. A diaphragm pump or other demand pump can then function efficiently despite a relative slow demand rate of the purification components (i.e., the less than one-tenth gallon per minute or so rate at which water may pass through the RO membrane 21). The pump turns on for short periods of time in order to store water under pressure in the accumulator components, with the stored water then able to flow continually at a slow demand rate from the accumulator to the purification components.

Although, it is known to insert an accumulator after the RO membrane 21, such as in the line 40 between the post filter 22 and the product water outlet 41, having the accumulator positioned upstream from the RO membrane results in the pump 23 cycling on and off less frequently so that there is less starting current expended and less wear on the pump 23, motor 24 and switch 23a.

According to yet another aspect of the invention, there is provided a self-contained battery supply mounted on the support structure for powering the pump components. It enables fully portable operation. A solar panel may also be included on the support structure for that purpose, together with 12-VDC power cord configured to be plugged into a conventional automotive cigarette lighter outlet. A twelve-volt converter for connection to an external source of alternating current may also be include.

The above mentioned and other objects and features of this invention and the manner of attaining them will become apparent, and the invention itself will be best understood, by reference to the following description taken in conjunction with the accompanying illustrative drawings.

DESCRIPTION OF THE PREFERRED EMBODIMENTS

Figure 1:
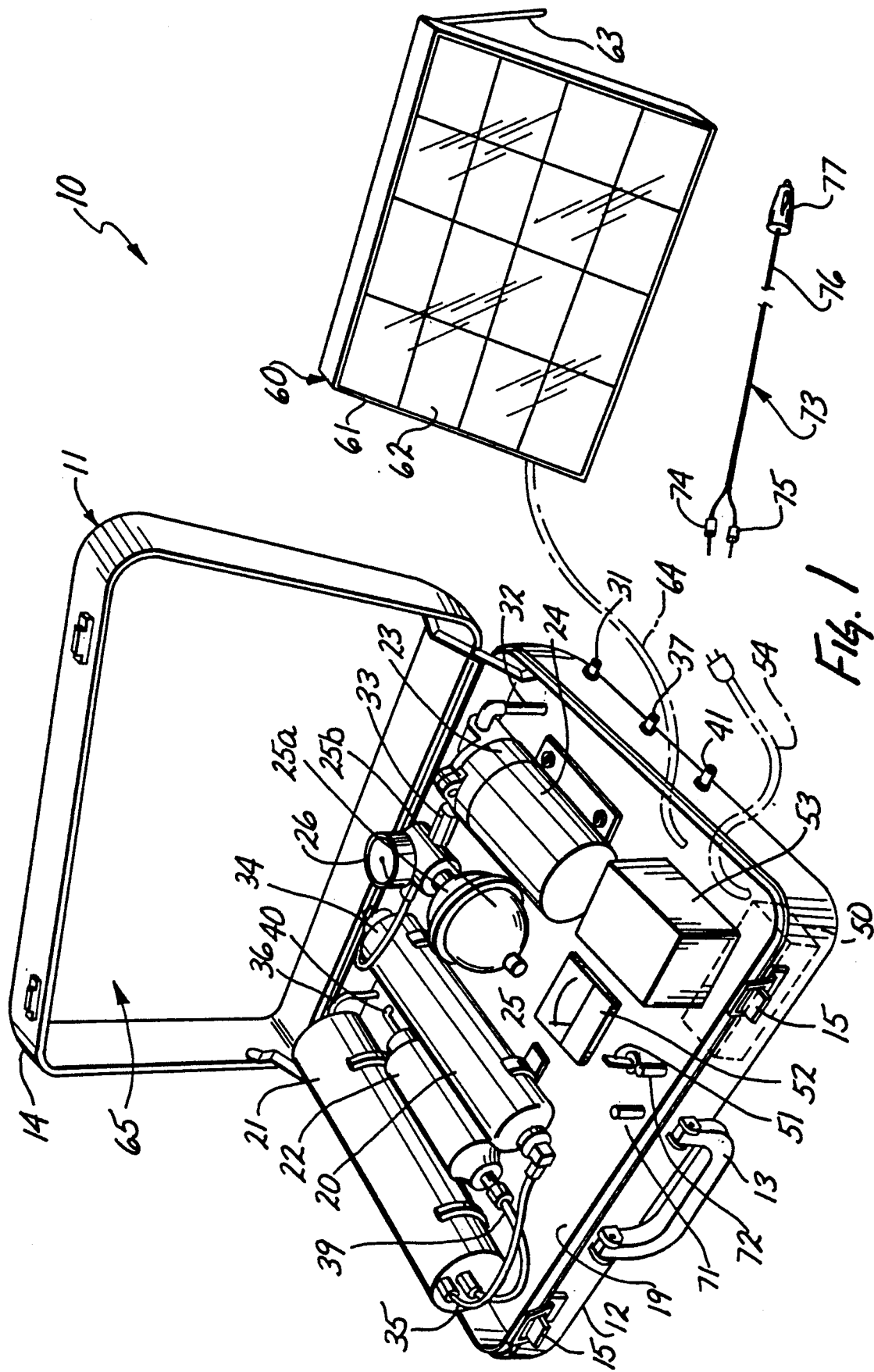
FIG. 1 of the drawings is a perspective view of a water purification system constructed according to the invention that includes an internal battery (shown dashed lines), a solar panel component, an 110-VAC to 12-VDC converter component, and a 12-VDC power cord component that enable operation with various power sources.

Referring now to the drawings, there is shown a water purification system or system 10 constructed according to the invention. Generally, the system 10 includes a support structure 11 on which are mounted various system components subsequently described. The support structure 11 is dimensioned and arranged to facilitate manual transportation (i.e., so that a user can transport it conveniently by grasping and carrying it). Thus, the system 10 can be conveniently carried to a desired location.

Although it can take any of various forms within the broader inventive concepts disclosed (including simply a board, chassis, box, case, cabinet, etc.) the support structure 11 of the system 10 is a briefcase-like or suitcase-like component. It has a base portion 12, a handle 13 mounted on the base portion 12, and a cover portion 14 mounted on the base portion 12 by suitable means such as hinges so that the cover portion 14 can be moved between the open position illustrated in FIG. 1 and a closed position in the well known manner of a conventional suitcase.

As an idea of size, the support structure 11 of the system 10 is approximately forty-five centimeters long along the side on which the handle 13 is mounted by thirty-six centimeters wide and sixteen centimeters deep. Of course, these dimensions are not critical. In addition, the support structure 11 is fabricated of sturdy components, using rigid material such as that used for known hard-case briefcases and suitcases. This helps protect components of the system 10 within, during air travel for example.

The user simply closes the cover portion 14 over the base portion 12 and closes a pair of latches or clasps 15. Then the user carries the support structure 11 and thereby the system 10 to a desired location utilizing the handle 13. In order to use the system 10, the support structure 11 is place upon a surface, the clasps 15 are unlatched, and the cover portion 14 is opened. Then the system 10 is operated as subsequently described. When finished, the user closes the support structure 11 and latches the clasps 15 ready the system 10 for transport.

Considering now the reverse osmosis water purification components and pump components of the system 10, they are mounted by suitable known means on the support structure 11, such as by being mounted on a rigid panel 19 within the support structure 11. The water purification components serve as purification means mounted on the support structure for producing at least partially purified water or product water and residue feedwater of waste water from feedwater by reverse osmosis, and the pump components serve as pump means mounted on the support structure for pumping feed water from a separate source to the purification means.

The water purification components include a prefilter component or prefilter 20, a reverse osmosis membrane component or RO membrane 21, and a post filter component or post filter 22, and these are supplied with feed water by the pump components which include a pump 23 and an electric motor 24. The electric motor 24 is operationally connected to the pump 23 in order to drive the pump 23 while an accumulator 25 accumulates the feedwater under pressure from the pump 23 and a pressure gauge 26 indicates the pressure.

In use, feedwater from a separate source (not shown) is coupled to an inlet 31 on the support structure 11 by suitable means such as a length of flexible tubing (not shown). In other words, one end of the tubing is connected to the inlet 31 and the other end of which is place in an external source of feedwater (a puddle of water, for example). The feedwater is drawn from the external source to the inlet 31 and through a fluid conducting conduit or line 32 from the inlet 31 to the pump 23 by operation of the pump 23.

From the pump 23, the feedwater is coupled by a line 33 to the accumulator 25 where it accumulates under pressure. In that regard, the accumulator 25 serves as accumulator means mounted on the support structure and coupled to the pump means upstream from the purification means for accumulating the feedwater under pressure for coupling to the purification means.

Next, the feedwater is coupled by a line 34 from the accumulator 25 to the prefilter 20, by a line 35 from the prefilter 20 to the RO membrane 21, and by a line 36 from the RO membrane 21 to a waste water outlet 37 on the support structure 11, a known type of check valve 38 in the line 36 (FIG. 2) preventing a backflow of water from the waste water outlet 37 to the RO membrane 21. Purified or product water from the RO membrane 21 is coupled by a line 39 to the post filter 22 and from there by a line 40 to a product water outlet 41 on the support structure 11.

Considering the above components in further detail, each of the inlet 31, the waste water outlet 37, and the product water outlet 41 includes a suitable known connector or fitting mounted on the support structure 11. They may be chosen to enable connection to quarter-inch flexible tubing, for example. Each of the fluid carrying conduits or lines may take the form of a suitable known rigid or flexible tubing and associated fittings, serving as the plumbing interconnecting the purification components, the pump components, the inlet, and the outlets.

Although any of various pumping structures may be employed within the broader inventive concepts disclosed, the pump 23 includes a known type of diaphragm pump. It is a positive displacement pump designed according to known techniques for quiet, efficient operation and to supply a low flow at about eighty pounds-per-square-inch (psi) of pressure. It is self priming and can draw feedwater to a height of three feet above an external feedwater source or directly from a fresh water tap in order to purify feedwater from that source as well. Of course, each of these characteristics may be modified within the broader inventive concepts.

The pump 23 is driven by the motor 24, and the two units may take the form of a commercially available pump and motor unit, such as a modified model 8000 pump manufactured by Shurflo, or the unit described in U.S. Pat. No. 4,610,605 to Hartley. Although various types of motors may be employed, the motor 24 includes a known type of 24-VDC electric motor that has the armature winding changed and is operated at 12-volts. This reduces speed to about one-third normal speed (i.e., 600 rpm instead of 1800 rpm) and that slower speed results in quieter operation and less current drain. The motor 24 may draw about three amperes while operating to fill the accumulator 25, for example.

Figure 2:
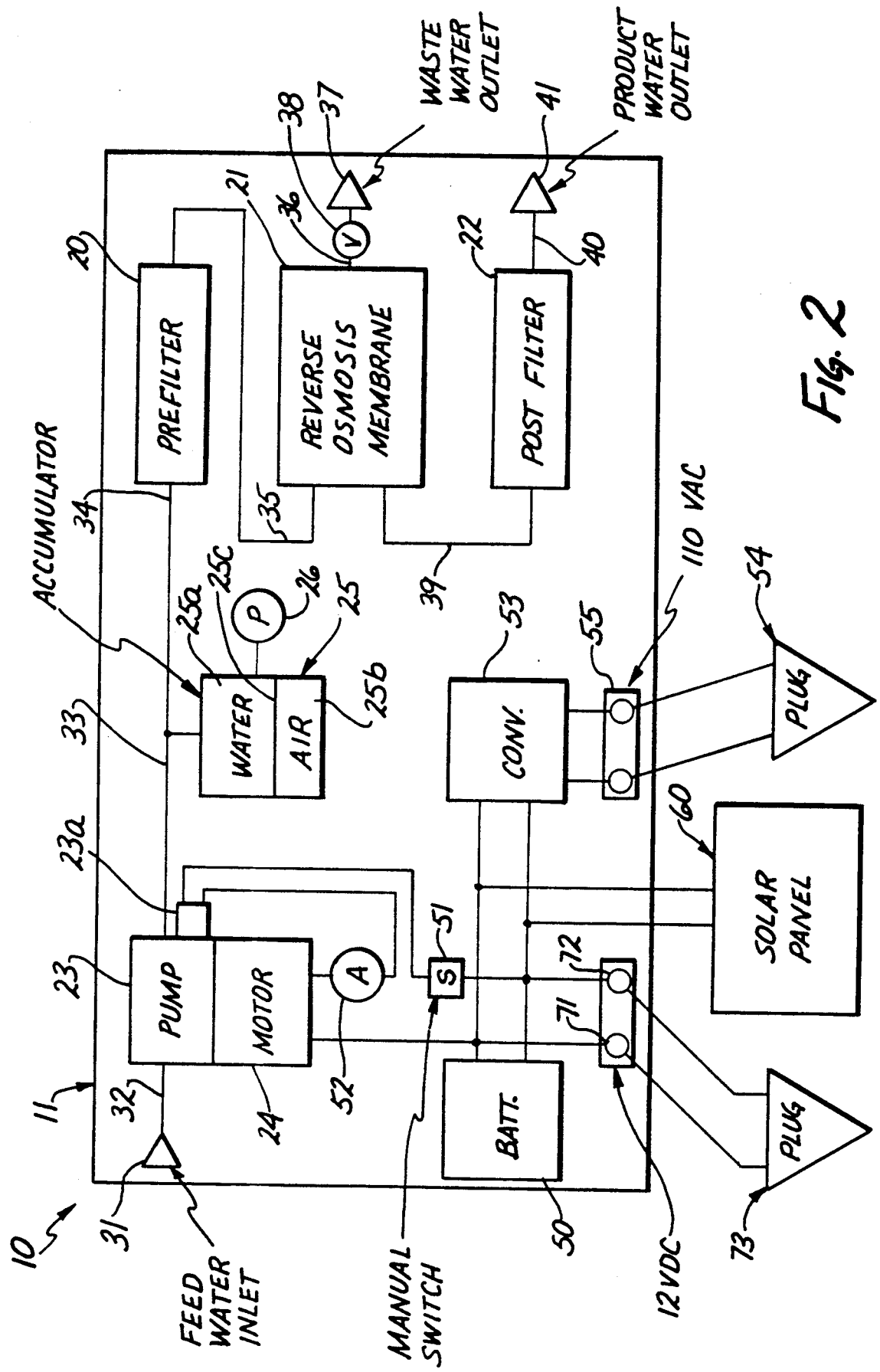
FIG. 2 is a diagrammatic view in block diagram form showing interconnection of the system components.

The accumulator 25 employs known structure to provide a vessel, reservoir, pressurized storage tank in which to accumulate feedwater under pressure. It also functions to dampen feedwater surges caused by operation of the pump 23. It may be fabricated from a suitable material such as metal or plastic material and include both a water chamber 25a and an air chamber 25b (FIGS. 1 and 2) that are separated by a rubber bladder or diaphragm 25c (FIGS. 2). The accumulator designated Model 500 that is available from Amtrol Inc. may be used, for example. The air chamber is precharged with air pressure according to the pressure switch setting (i.e., if the pressure switch turns on at 65 psig, the air pressure in the air chamber 25b would be 65 psig). As water is pumped into the water chamber 25a, the diaphragm 25c moves toward the air chamber 25b to compress air within the air chamber 25b. This occurs until the pressure switch 23a opens to turn the motor 24 and pump 23 off.

The pressure gauge 26 coupled to the accumulator 25 also employs known structure to provide a visually discernible indication of the pressure supplied to the RO membrane 21. Of course, it could be inserted elsewhere downstream from the pump 23 for this purpose.

In operation, the motor 24 operates to drive the pump 23 and thereby store feedwater under pressure in the accumulator 25. When the feedwater pressure in the accumulator 25 reaches a predetermined upper level, such as about 80–100 psi, for example, a known type of pressure switch 23a (FIG. 2) connected to the pump 23 opens to turn the motor 24 off. Feedwater is then supplied without the motor 24 and pump 23 operating, from the accumulator 25 and through the prefilter 20 to the RO membrane 21, until the feedwater pressure reaches a predetermined lower level, such as about 65 psi, at which time the pressure switch 23a closes to restart the motor 24.

The prefilter 20, RO membrane 21, and post filter 22 employ known structure used for reverse osmosis applications. The prefilter 20 may include both a sediment filter portion for removing suspended matter and undissolved solids and a carbon filter portion for removing dissolved matter. The filter designated "CL 10 RO" that is available from the Omnipure Filter Co. of Caldwell, Idaho may be used, for example.

The post filter 22 may include an activated-carbon portion for improving odor and taste of the product water. The filter designated "CL 6 RO" that is available from the Omnipure Filter Co. may be used, for example.

The RO membrane 21 may include a known type of thin film composite membrane or a cellulose tri-acetate membrane, for example, having pores of about 0.0001 micron in size (not shown). The membrane cartridge designated "Nimbus CS-1" that is available from Nimbus Water Systems, Inc. of Escondido, Calif. may be used, for example.

Feedwater passing through the prefilter 20 enters the RO membrane 21 where water molecules pass through the membrane to produce purified product water (i.e., at least partially purified), leaving larger molecules behind in the brine or waste water that is coupled to the waste water outlet 37 while the purified product water is coupled to the product water outlet 41.

Considering now the electrical aspects of the system 10, there are provided various components enabling a user to power the pump 24 using any of various power sources. Preferably, the system 10 includes a known type of internal battery circuit 50 for that purpose, such as a 4.8 ampere, 12-volt battery and associated components that are contained within the support structure 11. The battery circuit 50 includes a battery and known circuitry for charging the battery from an externally supplied source of power, and it is operationally connected to the motor 24 through a manual switch 51, the pressure switch 23a mentioned above, and a ten-amp ammeter 52 that serves as ammeter means for indicating the amount of electric current being drawn by the pump means (FIGS. 1 and 2). Thus, a user can turn on the system 10 by operating the manual switch 51 and monitor the current drain by viewing the meter 52, and other sources of electrical energy can be used to charge the battery circuit 50.

The system 10 also includes a known type of converter circuit 53 that converts alternating current to twelve volt direct current. The converter circuit 53 can be selected for use with various alternating current voltage levels or even be switchable between various predetermined voltage levels, the converter circuit 53 operating to convert 110-VAC electrical energy conducted by an AC cord 54 from an external source of alternating current (not shown) to an AC input connector 55 (FIG. 2). Thus, the user can power the system 10 from a conventional source of AC power, such as by plugging it into the AC outlet of a recreational vehicle, for example.

The system 10 also includes a solar panel component 60 for producing 12-VDC electrical energy from the rays of the sun. The solar panel component 60 includes a frame 61 on which is mounted a solar panel 62, a support or stand 63 is included that can be used to prop or hold the solar panel component 60 in a desired position relative to the rays of the sun, and a cord 65 that connects the solar panel 62 in parallel with the output of the battery circuit 50 and the output of the converter circuit 53 as shown in FIG. 2.

The solar panel component 60 is dimensioned and arranged so that it can be carried in a space 65 in the cover portion 14 of the support structure 11 (FIG. 1). It is held there removably by suitable known means (not shown). The user removes the solar panel component 60, props it up in the rays of the sun using the stand 63, and adjust its position so that the solar panel 62 is in a position facing the sun (i.e., the solar panel 62 faces the rays of the sun).

The solar panel 62 employs known componentry, such as known photovoltaic cells, and it is suitably configured to provide sufficient power to charge the battery circuit 50, the illustrated solar panel 63 producing 12-VDC at 400 milliampere for this purpose. It charges the battery circuit 50 during the intermittent off periods of the motor 24 that occur when the feedwater pressure in the accumulator 25 is above the predetermined lower level at which the pressure switch 25a closes.

In addition to the foregoing, the system 10 includes two 12-VDC connectors 71 and 72 that enable a user to use other external sources of 12-volt electrical power. The connectors 71 and 72 are connected to the battery circuit 50 as shown in FIG. 2 so that an external source connected to the connectors 71 and 72 is connected in parallel with the battery circuit 50. A cord 73 is provided for use in connecting the connectors 71 and 72 to a conventional automotive battery. The cord 73 includes a pair of plugs 74 and 75 that plug into the connectors 71 and 72, a length of electrically conductive, two-wire line 76, and a known type of cigarette lighter connector 77 that is configured to be plugged into a conventional automotive cigarette lighter outlet. Of course, other wiring arrangements can be used instead, such as jumper cables.

Thus, this invention combines a number of known components in a portable unit having the desired functionality. It can be conveniently transported. It can be powered by any of various available electrical power sources, and it can draw feedwater from any of various available water sources.

Although an exemplary embodiment of the invention has been shown and described, many changes, modifications, and substitutions may be made by one having ordinary skill in the art without necessarily departing from the spirit and scope of the invention.

What is claimed is:

1. A reverse osmosis water purification system, comprising:
    a support structure in the form of a suitcase-like component;
    purification means mounted on the support structure for producing product water and waste water from feedwater by reverse osmosis, the purification means including a prefilter, a reverse osmosis membrane, and a post filter connected in series;
    a diaphragm pump mounted on the support structure for pumping feedwater from a separate source;
    inlet means on the support structure for coupling the feedwater from the separate source to the diaphragm pump;
    accumulator means mounted on the support structure and coupled to the pump for accumulating the feedwater from the pump for coupling to the prefilter;
    first outlet means on the support structure for outletting the product water from the post filter;
    second outlet means on the support structure for outletting the waste water from the purification means;
    a battery mounted on the support structure for powering the diaphragm pump;
    a solar panel mounted on the support structure for powering the diaphragm pump; and
    means mounted on the support structure for enabling a user to connect the diaphragm pump to an external source of electrical power.

2. A system as recited in claim 1, wherein the suitcase-like component includes a base, a cover mounted on the base for movement between an open position and a closed position, and a handle for use in manually transporting the system.

3. A system as recited in claim 1, wherein the accumulator means includes:
    pressure gauge means for indicating the pressure of the supply of feedwater in the accumulator means.

4. A system as recited in claim 1, wherein:
    the solar panel is removable from the support structure.

5. A system as recited in claim 4, including
    means for supporting the solar panel apart from the support structure in position facing the sun; and
    means for coupling the pump means to the solar panel.

6. A system as recited in claim 1, wherein the means for enabling includes:
    a cord having a connector configured to be plugged into a conventional automotive cigarette lighter outlet.

7. A system as recited in claim 1, wherein the enabling means includes:
    a converter component carried by the support structure.

8. A system as recited in claim 1, further comprising:
    ammeter means carried by the support structure for indicating the amount of electric current being drawn by the pump.

* * * * *